(12) United States Patent
Grywacheski et al.

(10) Patent No.: US 7,344,020 B2
(45) Date of Patent: Mar. 18, 2008

(54) BELT CONNECTION FOR AGRICULTURE CONVEYOR

(75) Inventors: Sheldon Joseph Grywacheski, Eldridge, IA (US); Jobey Matthew Schnepf, Davenport, IA (US); Ronald Leo Sheedy, Eldridge, IA (US)

(73) Assignee: Deere & Company, Moline, IL (US)

( * ) Notice: Subject to any disclaimer, the term of this patent is extended or adjusted under 35 U.S.C. 154(b) by 302 days.

(21) Appl. No.: 11/149,762

(22) Filed: Jun. 10, 2005

(65) Prior Publication Data

US 2006/0278499 A1   Dec. 14, 2006

(51) Int. Cl.
*B65G 15/30* (2006.01)
(52) U.S. Cl. .................................... 198/844.2
(58) Field of Classification Search ............ 198/844.2; 24/33 L; 403/408.1; 474/255, 257
See application file for complete search history.

(56) References Cited

U.S. PATENT DOCUMENTS

| | | | | | |
|---|---|---|---|---|---|
| 390,233 | A | * | 10/1888 | Jackson | .......................... 24/37 |
| 460,799 | A | * | 10/1891 | Kelly | ............................. 24/38 |
| 756,548 | A | | 4/1904 | White | |
| 1,803,354 | A | * | 5/1931 | Purple | ........................... 24/37 |
| 3,414,123 | A | * | 12/1968 | Litt et al. | ................... 206/486 |
| 3,744,095 | A | * | 7/1973 | Tomlinson | ...................... 24/38 |
| 4,279,676 | A | | 7/1981 | Morrison et al. | ........... 156/159 |
| 4,705,495 | A | * | 11/1987 | Madion | ...................... 474/255 |
| 4,721,497 | A | * | 1/1988 | Jager | ........................... 474/255 |
| 5,092,823 | A | * | 3/1992 | Longo | ......................... 474/253 |
| 5,136,832 | A | * | 8/1992 | Sund | ........................... 56/364 |
| 5,405,477 | A | | 4/1995 | Arnold | ..................... 156/304.3 |
| 5,542,527 | A | * | 8/1996 | Jakob | ...................... 198/844.2 |
| 5,988,927 | A | * | 11/1999 | Pfarr | ............................. 403/2 |
| 6,131,728 | A | * | 10/2000 | Rizhanovsky | ............ 198/844.2 |
| 6,228,131 | B1 | * | 5/2001 | Grobel et al. | ............... 403/337 |
| 6,238,131 | B1 | * | 5/2001 | Watts et al. | ................ 403/337 |
| 6,601,698 | B2 | * | 8/2003 | Jakob | ...................... 198/844.2 |
| 6,675,853 | B2 | * | 1/2004 | Shaffer | ....................... 156/502 |

\* cited by examiner

*Primary Examiner*—Douglas A Hess

(57) ABSTRACT

An endless crop conveying belt loop has a bolted connection including belt material having a top and bottom surface and first and second opposed ends. Each of the two opposed ends having complementary patterns of half wave shapes. Each pattern has a plurality of longitudinal extensions alternating with transverse straight edges. The longitudinal extensions are interwoven between respective extensions of the complementary pattern on the opposed end so that the longitudinal extensions of both opposed ends overlap the top surface of the opposed end and the transverse straight edges of both opposed ends are generally aligned. A staggered array of fasteners secures the two opposed ends together.

20 Claims, 4 Drawing Sheets

US 7,344,020 B2

BELT CONNECTION FOR AGRICULTURE CONVEYOR

FIELD OF THE INVENTION

The present invention relates to an endless or continuous belt, such as a draper or conveyor belt, for use in agricultural equipment and in particular to a bolted connection for joining two opposed belt ends using an interwoven configuration to form an endless belt.

BACKGROUND OF THE INVENTION

Endless belts such as draper or conveyor belts have many uses in agricultural machines. For example, draper belts are used as crop conveyors in swath or windrow belt pick-up platforms that are used with combine harvesters. Some agricultural draper belts used in belt pick-up attachments or similar agricultural machines are joined together by well know joint connections such as a pin and lace splice. A pin and lace splice uses an elongated pin threaded transversely through lacings on each end of the belt so as to create an endless belt loop. However, it is difficult to make field repairs or replace pin and lace splice belts.

Other known agricultural conveyor belts use a simple bolted joint to connect two straight ends of the belt. The ends are over-lapped and secured together by fasteners, such as a nut and bolt. The bolt is inserted perpendicularly through the two belt surfaces. Often a transversely extending flat cover plate is used with the fasteners on the outside face of the belt joint. It is easier to make field repairs and to replace the belt with a bolted joint, but the performance of the bolted joint belt is not as smooth as the pin and lace splice.

Because of the overlapping belt material at the belt joint and because the bolt heads protruding inward on the underside of the joint, the bolted joint can cause the belt to jump and/or slip when the joint and bolts pass over a roller or other support. The belt has a double thickness at the joint and the bolt heads protrude beyond the inside face of the assembled belt. These discontinuous surfaces can cause vibration, belt slippage, wear on the rollers and stress on the belts.

Another bolted belt joint uses a curved metal cover plate over the over-lapping bolted joint. The curved metal cover plate spans the transverse extent of the joint. When the bolts are tightened, the curved plate exerts inward forces on the belt material that produces a recess in the belt to reduce the protrusion of the bolt heads beyond the inside face of the belt.

SUMMARY OF THE INVENTION

The present invention provides a connection for an endless belt loop that uses an interwoven and aligned bolted connection that eliminates the need for a cover plate. The present invention reduces belt jump and belt slippage when the bolted connection passes over rollers.

A bolted connection is used to form an endless crop conveying belt loop. The belt loop has an inside face and an outside face. The connection includes belt material having a top and bottom surface and first and second opposed ends. Each of the two opposed ends have a complementary pattern of half wave shapes. Each pattern has a plurality of longitudinal extensions alternating with transverse straight edges. Each longitudinal extension is interwoven between respective extensions of the complementary pattern on the opposed end so that the longitudinal extensions of both opposed ends overlap the top surface of the opposed end and the transverse straight edges of both opposed ends are generally aligned. A staggered array of fasteners such a bolts secures the opposed ends together.

The connection further includes first apertures located on the longitudinal extensions and second apertures located adjacent the transverse straight edges. The first apertures align with the second apertures when the two opposed belt ends are interwoven and overlapped. Each fastener has a head, a threaded portion extending opposite the head and a threaded locking nut. Each threaded portion is inserted through a respective second aperture so that the fastener head abuts the bottom surface of one opposed belt end. The threaded portion of the fastener extends through the aligned first aperture and above the top surface of the opposed belt end. A washer is positioned on the extending threaded portion of the fastener and a respective locking nut is threaded on a respective fastener to secure the washer on the fastener. The nut compress the two opposed belt ends together between the washer and fastener head.

The invention reduces the "jump" as the bolted connection passes over the conveyor rollers. The present connection provides a smoother inside face for an endless conveyor belt. The tightened nuts pull the fastener heads into a recess created in the bottom face of the belt by the concaved washers.

The endless belt using the connection of the present invention can be readily assembled, repaired or replaced in a maintenance facility or in the field. The endless belt can be replaced without regard to a direction of travel. Since the longitudinally extending edges are always on the top face of the belt, belt jump, slippage and vibration are reduced.

DETAILED DESCRIPTION OF THE INVENTION

Figure 1A:
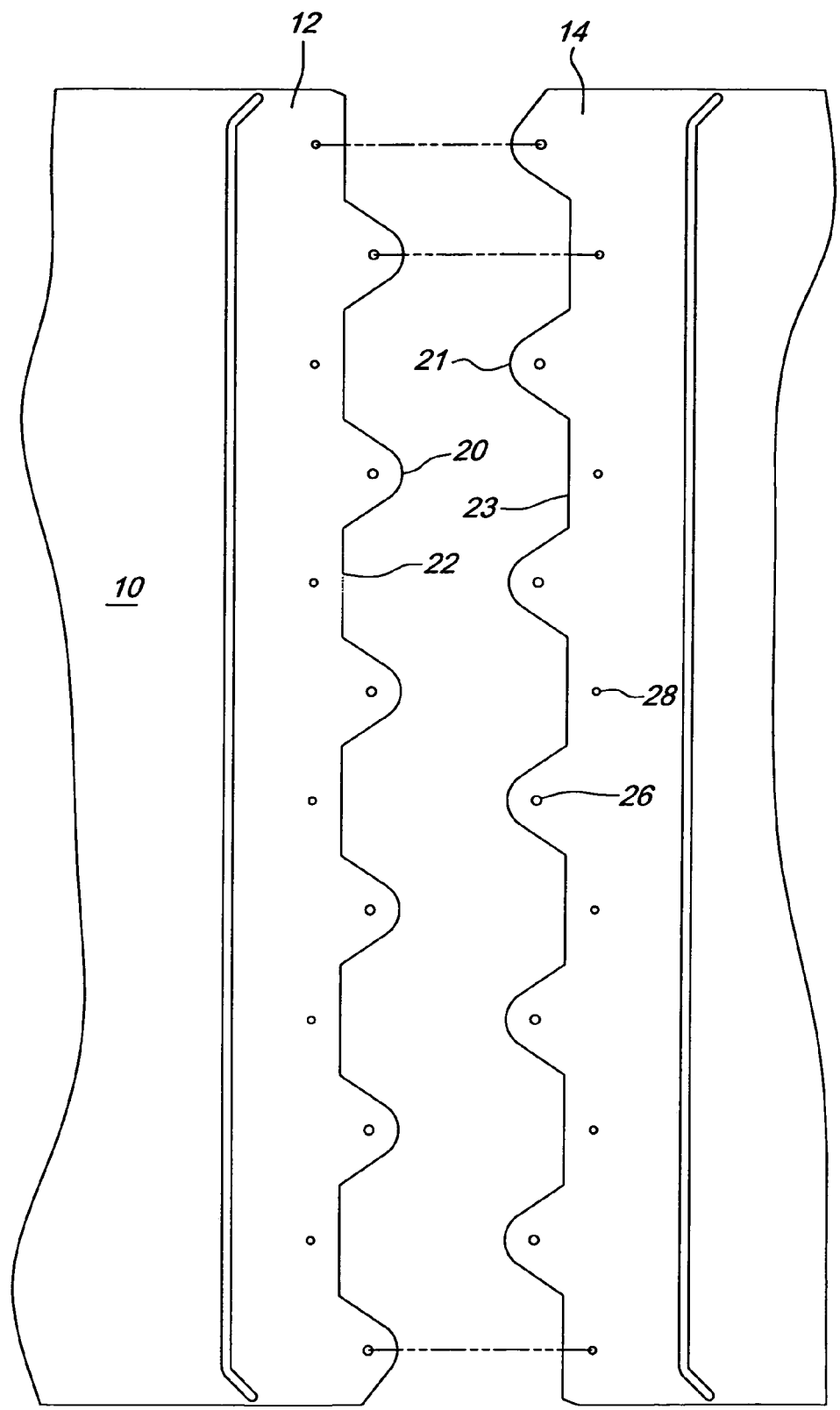
FIG. 1A is a plan view of the two complementary half wave shapes of the two opposed ends of an unassembled belt section according to the present invention.

Referring now to FIG. 1A, an unassembled section of belt material 10 is shown before connection according to the present invention. The belt material has a predetermined thickness and is generally flexible and resilient. The unassembled belt section has a predetermined transverse width and longitudinal length that is appropriate for the proposed use of the assembled endless belt. The two opposed ends 12 and 14 of the belt section are each formed or constructed to have a pattern of half wave shapes. Both opposed end portions of the belt section may be manufactured or cut to form the half wave shapes, for example. Alternatively, a belt section may be integrally manufactured to have the desired half wave shape on the two opposed ends.

The half wave pattern includes a series of longitudinally extending extensions 20 and 21. Preferably the longitudinal extensions have a generally curved or curvilinear shape, such as the shape of a truncated sine wave. Alternatively, the longitudinal extensions may be generally rectangular and tapered. A curved and/or tapered shape is preferred because it allows easier interweaving or indexing of the extensions during assembly. The longitudinally extensions 20 and 21 are preferably evenly spaced across the two opposed ends 12 and 14 of the belt material.

In the half wave pattern shown in FIG. 1A, a plurality of transverse straight edges 22 and 23 are positioned between the longitudinal extensions 20 and 21 to form the half wave shape. The valley (or lower wave cycle) of each full wave shape is truncated by the transverse straight edges 22, 23. Preferably the transverse straight edges 22, 23 are perpendicular to the direction of rotation of the endless belt. The open width along each transverse straight edge portion 22 and 23 is at least equal to the width across the base of the longitudinal extensions 20 and 21 so as to facilitate interweaving or indexing of the extensions during assembly.

Figure 1B:
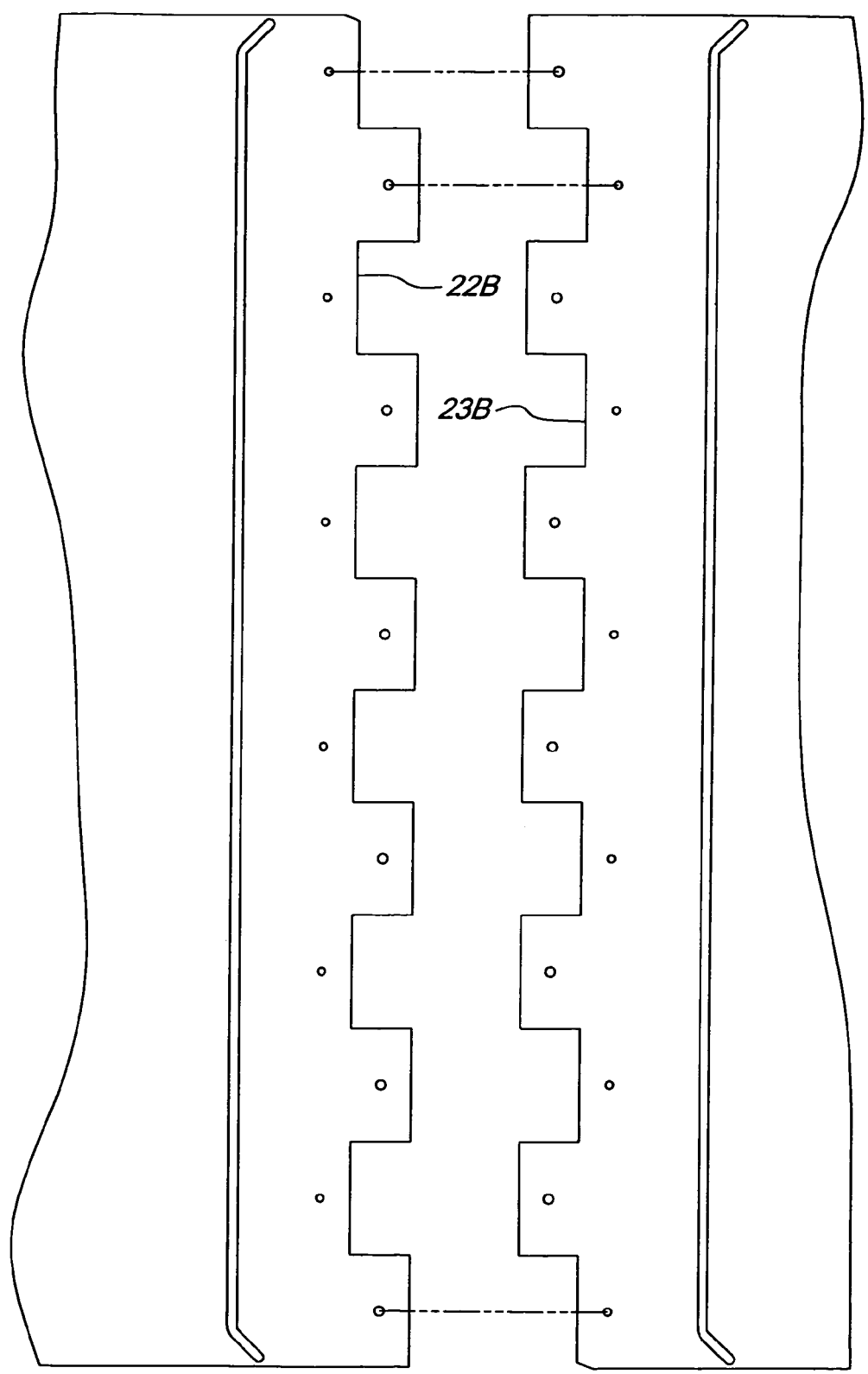
FIG. 1B shows an alternative square half wave pattern according to the present invention.

FIG. 1B shows an alternate half wave pattern that can also be used according to the present invention. A square wave pattern is shown. For a square wave, the transverse straight edge 22B of the half wave shape is the base portion of the full square wave.

The two opposed ends 12 and 14 of the unassembled belt section have two complementary patterns of half wave shapes. Specifically, the two opposed ends have opposite, mirror image half wave shapes with a transverse offset of one half of the wave cycle, as shown in FIG. 1A, for example. The two opposed ends 12 and 14 do not have straight mirror image half wave patterns. The longitudinal extensions 20 and transverse straight edges 22 on a first end 12 of the belt complements, in an opposite and offset manner, the half wave pattern of longitudinal extensions 21 and transverse straight edges 23 on the opposed second end 14 of the belt.

A staggered array of first 26 and second 28 apertures, or fastener holes, are provided through each opposed end of the belt. The apertures are sized to accommodate fasteners, such as bolts, that are used to connect the two opposed ends of the belt. The first apertures 26 are provided through the longitudinal extensions 20 and 21. Preferably, one aperture 26 is located in the center of each extension. The second apertures 28 are provided adjacent the transverse straight edges 22 and 23. The second apertures 28 are set back from the transverse straight edge 22, 23 by a predetermined longitudinal distance so that the first and second apertures will align when the two opposed ends 12 and 14 of the belt are looped and assembled. The alignment of the apertures in an overlapping and interwoven endless belt configuration is shown in FIG. 1A by dotted lines.

Figure 2:
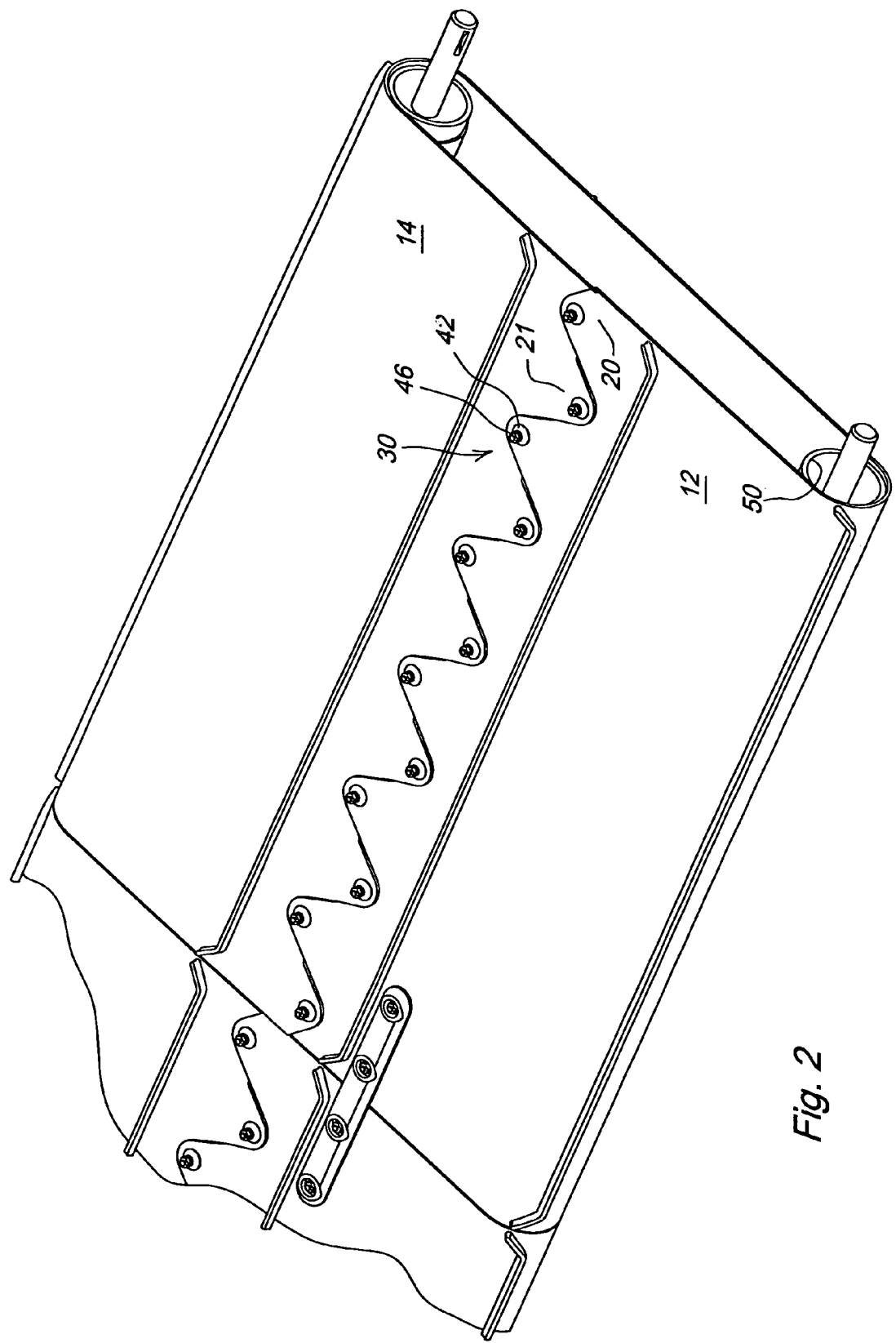
FIG. 2 is a perspective view of an assembled belt using the bolted connection and the belt section shown in FIG. 1A.

Referring now to FIG. 2, the two opposed ends 12 and 14 of the belt having the two complementary half wave patterns shown in FIG. 1A are looped and overlapped. The longitudinal extensions are interwoven or indexed to form an assembled endless belt loop according to the invention. The longitudinal extensions 20 on the first opposed end 12 are interwoven between the longitudinal extensions 21 on the second opposed end 14. Thus, the longitudinal extensions 20 and 21 on both opposed ends overlap, or overlay, the transverse straight edges 22 and 23 on both opposed ends when the belt material is configured into an endless belt loop.

Figure 3:
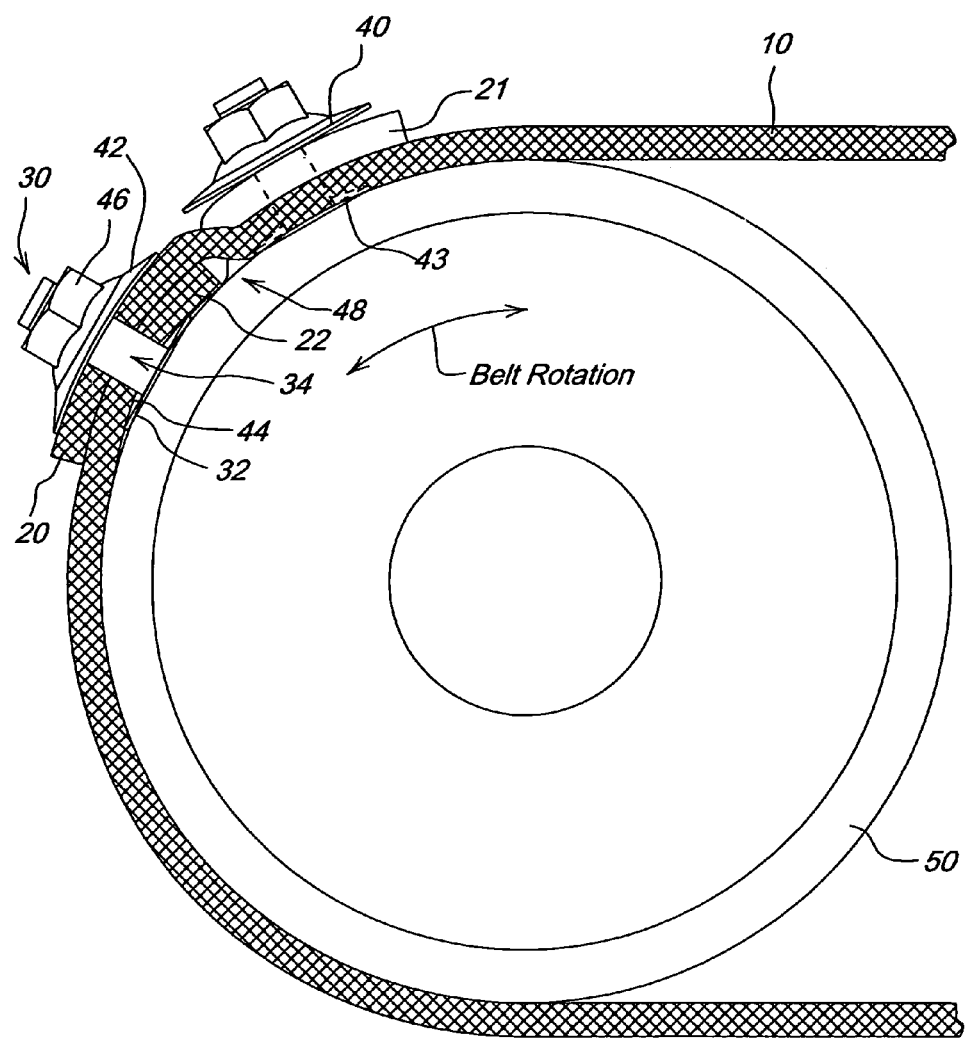
FIG. 3 is a cross-sectional side view of the bolted connection and assembled belt shown in FIG. 2 positioned over a roller.

To form the belt connection as shown in FIG. 3, fasteners, such as threaded bolts 30, are inserted through the second apertures 28 in the bottom surface of each opposed end of the belt. Preferably, the bolts have a flat or low profile head 32 and a threaded portion 34 extending from the head. Optionally, a push nut may be pushed onto the fastener threads to hold the inserted fasteners 30 in position in the second apertures and to hold the belt material against the fastener head 32 before further assembly. At least one opposed end is looped around and the longitudinal extensions 20 and 21 are interwoven to form an endless belt configuration, as previously described. The threaded portion 34 of the fasteners that extends through the second apertures 28 are then inserted through the aligned first apertures 26 in the opposed end of the belt.

Annular washers 40 or 42 are then positioned on the threaded portion 34 of the fasteners that are extending through the aligned first and second apertures of the belt material. Two alternative washer embodiments are shown in FIG. 3. The washer 40 has a flat configuration, such as a standard flat washer. Alternatively, the washer may be concaved 42 (that is, tapered or cupped downward). Both washer configurations have a larger outer diameter and surface area than the diameter and surface area of the flat head 32 of the fastener. The concaved washer 42 is preferred because the concave will create an enhanced recess 44 for the fastener head on the bottom face of the belt material. The concaved configuration applies a pinching force at the outer diameter of the washer and therefore closer to the edges of the wave shape. The pinching effect reduces the crop material that can enter under the leading edge of the belt. A locking nut 46, such as a flange nut, is threaded on the threaded end 34 of the fastener on top of the washers 40 or 42 and is tightened.

As the locking nuts are tightened on the fasteners, the larger diameter and surface area of the washers 40 or 42 pulls the flat heads 32 of the fasteners, which have a smaller diameter and surface area, into the resilient belt material. The tightened nuts draw the flat bolt heads 32 into the resilient belt material. The washers create a recess 43 or 44 on the inside face of the belt. A flat washer 40 creates a shallow recess 43 that is predominately determined by the resilience of the belt material. The outer edges of the concaved washer 42 pinches the belt material and creates an enhanced depth recess 44 due to the cupped shape of the concaved washer. Both recess are on the inside face of the resilient belt material, on the opposite face to the washer 40 or 42. The washer and locking nut 46 abut the outer face of the belt. The area of the recess generally corresponds to the area of the flat or concaved portion of the washer.

When the longitudinal extensions 20 and 21 on the two opposed ends 12 and 14 are interwoven and overlapped, the extensions are positioned on the outside face of the belt. The transverse straight edges 22 and 23 are generally aligned along alignment 48 on the inside face of the assembled belt, as shown in FIG. 3.

According to the present invention, when the inside face of the endless belt, and specifically the bolted connection and the alignment 48 at the interwoven overlap, is rotated and passes over a surface, such as a curved roller 50, the previously described "jumping" and vibration is reduced, compared to the jump by previously known bolted joints. The endless belt of the present invention tends to slip less, thus providing better torque transfer from the driven roller to the belt. This smoother and improved performance is a result of two features of the connection provided by the present invention. The recesses 43 or 44 created in the inside face of the belt, and specifically the enhanced recess 44, pulls the fastener heads 32 into the resilient material for smoother rotation. Also, the alignment 48 at the interwoven overlap of the belt material on the inside face at the connection provides the inside face with a smoother and more consistent interface with the drive rollers.

The endless belt loop assembled according to the present invention can generally be rotated in either direction of rotation. This allows easier assembly, especially if the belt material is not constructed for rotation in a specific direction. Also, by using the complementary half wave patterns, the longitudinal extensions 20 and 21 of the two opposed belt ends can always be assembled to be on the top face of the endless belt loop. By using the complementary half wave pattern, the longitudinal extensions 20 and 21 can be assembled so as not to underlay the opposed end of the belt. Thus, longitudinal extensions 20 and 21 never have to be located on a leading edge on the inside face of the belt. An endless belt assembled according to the present invention avoids the possibility that a longitudinal extension 20 or 21 on an inside face might catch on a roller and bend over, causing an even more pronounced jump when the connection passes over the roller.

The above description is considered as illustrative only of the present invention. Modifications will be apparent to those skilled in the art. The present invention is not intended to be limited to the specific construction and operation shown and described. Therefore, modifications in structure or operation are intended to fall within the scope of the claimed invention.

The invention claimed is:

1. A bolted connection for forming an endless crop conveying belt loop, the belt loop having an inside face and an outside face, the connection comprising:
   belt material having a top and bottom surface and first and second opposed ends, each of the two opposed ends having complementary patterns of half wave shapes, each pattern having a plurality of longitudinal extensions alternating with transverse straight edges, wherein each longitudinal extension is indexed between respective extensions of the complementary pattern on the opposed end so that the longitudinal extensions of both opposed ends overlap the top surface of the opposed end and the transverse straight edges of both opposed ends are generally aligned; and
   a staggered array of fasteners for securing the two opposed ends together.

2. The connection of claim 1 further comprising:
   first apertures located on the longitudinal extensions and second apertures located adjacent the transverse straight edges so that the first apertures align with the second apertures when the two opposed belt ends are indexed and overlapped;
   each fastener having a head, a threaded portion extending from and opposite the head and a threaded locking nut, each threaded portion inserted through a respective second aperture so that the fastener head abuts the bottom surface of one opposed belt end and the threaded portion of the fastener extends through the aligned first aperture and above the top surface of the opposed belt end; and
   a plurality of washers and locking nuts, each washer positioned on the extending threaded portion of the fastener wherein a respective locking nut is threaded on the respective fastener to secure the washer on the fastener and secure the two opposed belt ends together between the washer and fastener head.

3. The connection of claim 2 wherein the washers have an outside diameter that is larger than the diameter of the fastener heads.

4. The connection of claim 3 wherein the washers are annular and flat.

5. The connection of claim 3 wherein the washers are concaved.

6. The connection of claim 5 wherein the concaved washers create recesses on the inside face of the endless belt loop when the locking nuts compress the two opposed belt ends together so that the fastener heads are pulled into the recess.

7. The connection of claim 1 wherein the longitudinal extensions of the two opposed belt ends are on the outside face of the endless belt loop.

8. The connection of claim 1 wherein the straight edges of the two opposed belt ends are aligned on the inside face of the endless belt loop.

9. The connection of claim 1 wherein the fasteners comprise threaded bolts with flat heads and locking nuts.

10. The connection of claim 1 wherein the longitudinal extensions of one of the first and second opposed ends of the belt is the leading edge for alternate directions of rotation for the endless belt loop.

11. An endless crop conveying belt comprising:
    a length of belt material having a top and bottom surface and first and second opposed ends, the material forming a belt loop having an inside face and an outside face, each of the two opposed ends having complementary patterns of half wave shapes, each pattern having a plurality of longitudinal extensions alternating with transverse straight edges, wherein each longitudinal extension is interwoven between respective extensions of the complementary pattern on the opposed end so that the longitudinal extensions of both opposed ends overlap the top surface of the opposed end and the transverse straight edges of both opposed ends are generally aligned; and
    a connection having a staggered array of fasteners for securing the two opposed ends together.

12. The endless crop conveying belt of claim 11 further comprising:
    first apertures located on the longitudinal extensions and second apertures located adjacent the transverse straight edges so that the first apertures align with the second apertures when the two opposed belt ends are interwoven and overlapped;
    each fastener having a head, a threaded portion extending from and opposite the head and a threaded locking nut, each threaded portion inserted through a respective second aperture so that the fastener head abuts the bottom surface of one opposed belt end and the threaded portion of the fastener extends through the aligned first aperture and above the top surface of the opposed belt end; and
    a plurality of washers and locking nuts, each washer positioned on the extending threaded portion of the fastener wherein a respective locking nut is threaded on the respective fastener to secure the washer on the fastener and secure the two opposed belt ends together between the washer and fastener head.

13. The endless crop conveying belt of claim 12 wherein the washers have an outside diameter that is larger than the diameter of the fastener heads.

14. The endless crop conveying belt of claim 13 wherein the washers are annular and flat.

15. The endless crop conveying belt of claim 13 wherein the washers are concaved.

16. The endless crop conveying belt of claim 15 wherein the concaved washers create recesses on the inside face of the endless belt loop when the locking nuts compress the two opposed belt ends together so that the fastener heads are pulled into the recess.

17. The endless crop conveying belt of claim 11 wherein the longitudinal extensions of the two opposed belt ends are on the outside face of the endless belt loop.

18. The endless crop conveying belt of claim 11 wherein the straight edges of the two opposed belt ends are aligned on the inside face of the endless belt loop.

19. The endless crop conveying belt of claim 11 wherein the fasteners comprise threaded bolts with flat heads and locking nuts.

20. The endless crop conveying belt of claim 11 wherein the longitudinal extensions of one of the first and second opposed ends of the belt is the leading edge for alternate directions of rotation for the endless belt loop.

* * * * *